Figure 1:
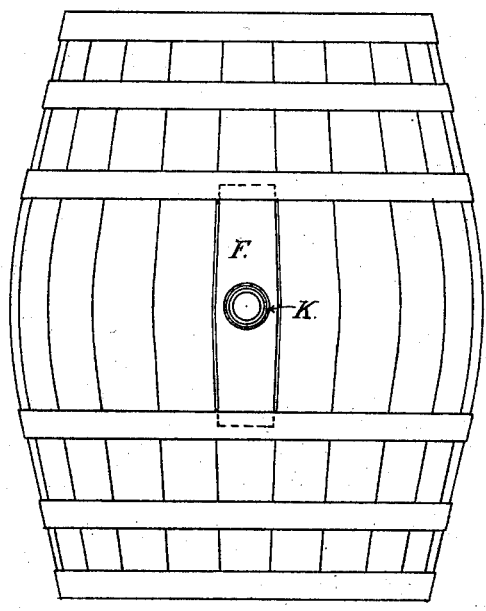

No. 625,814. Patented May 30, 1899.
A. TERRY, Jr.
COMBINED BARREL STAVE PROTECTOR AND BUNG HOLE BUSHING.
(Application filed Dec. 7, 1898.)
(No Model.) 2 Sheets—Sheet 1.

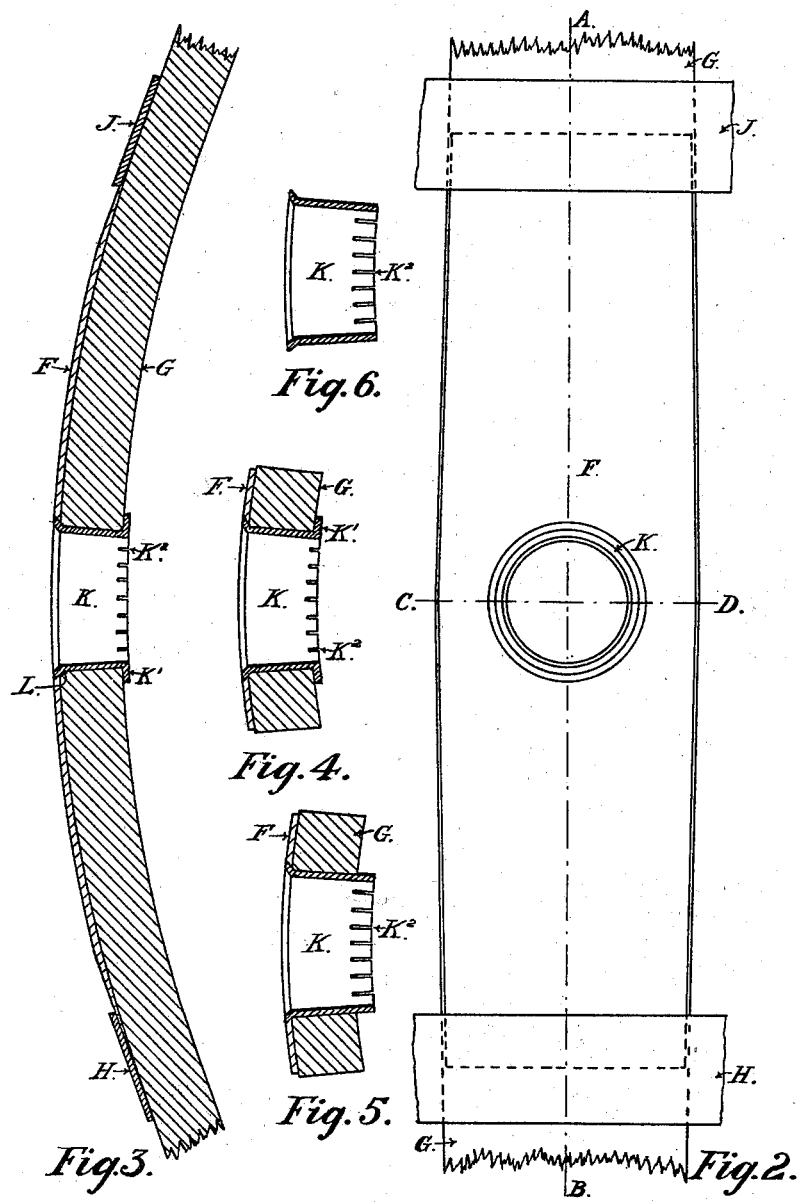

UNITED STATES PATENT OFFICE.

ALBERT TERRY, JR., OF SYDNEY, NEW SOUTH WALES.

COMBINED BARREL-STAVE PROTECTOR AND BUNG-HOLE BUSHING.

SPECIFICATION forming part of Letters Patent No. 625,814, dated May 30, 1899.

Application filed December 7, 1898. Serial No. 698,582. (No model.)

*To all whom it may concern:*

Be it known that I, ALBERT TERRY, Jr., brewer, a subject of the Queen of Great Britain, residing at Sydney, in the British Colony of New South Wales, Australia, have invented a new and useful Combined Barrel-Stave Protector and Bung-Hole Bushing, (for which I have obtained a provisional protection in the Colony of New South Wales, No. 8,341, bearing date May 7, 1898,) of which the following is a specification.

My invention relates to an improvement in barrels or casks; and the object of my improvement is to strengthen the wooden stave and also to protect it from being cut when the bung is being dressed or trimmed flush after being driven into the bushing. I attain these objects by the means illustrated in the accompanying drawings, in which—

Figure 1 is a plan view of a barrel complete with the protector-plate and bushing. Fig. 2 is a plan view of the protector-plate and bushing drawn to a larger scale. Fig. 3 is a longitudinal section on line A B of Fig. 2. Fig. 4 is a cross-section on line C D of Fig. 2. Fig. 5 is a cross-section on line C D of Fig. 2 previous to the inner end of the bushing being turned over onto the wooden stave. Fig. 6 is a cross-section of the bushing before being placed into the hole of the plate.

Similar letters refer to similar parts throughout the several views.

The protector-plate F, which is of steel or other suitable metal, is so shaped that its under side corresponds with and fits the exterior surface of the wooden stave G of the barrel and is of such a length that its ends, which are tapered like a wedge, will extend underneath the two middle hoops H and J and be thereby firmly secured, as shown in Figs. 1, 2, and 3. This protector-plate F, which is in width a little narrower than the wooden stave G, has a countersunk or chamfered hole in its center, into which fits a bushing K, of copper or other suitable metal, having its outer end swelled or enlarged to correspond with the chamfered hole of the protector-plate F. The opposite end of this bushing K is expanded out and forced over so as to grip tightly onto the inner surface of the wooden stave G, and thus secure it firmly in position, as shown at K', and to enable this end of the bushing being easily expanded out and forced over it is saw-cut in several places, as shown by $K^2$ $K^2$ $K^2$. This bushing K, as shown in Figs. 3, 4, 5, and 6, is slightly taper or conical to suit the ordinary wooden bungs used for closing up barrels.

In usual practice I fix the protector-plate and bushing onto the wooden stave before the barrel is put together, and to guard against the possibility of any leakage of the contents of the barrel I prefer to insert a little hemp, flax, or other suitable material between the plate and the stave immediately around the bushing, as indicated by L in Fig. 3.

Having thus particularly described and ascertained the nature of this invention and in what manner the same is performed, I declare that what I claim is—

1. The combination with a barrel; of a metallic protecting-plate conforming and applied exteriorly to the bung-stave thereof, said plate having a hole agreeing with that in the bung-stave, and having its ends inserted under the adjacent hoops of the barrel; a bushing extending inwardly from the protecting-plate and independent thereof, and projecting through and beyond the hole in the bung-stave; and means for securing the inner end of the bushing in position.

2. The combination with a barrel; of a metallic protecting-plate conforming and applied exteriorly to the bung-stave thereof, said plate having a countersunk hole agreeing with that in the bung-stave, and having its ends inserted under the adjacent barrel-hoops; an independent bushing fitting the holes in the bung-stave and protecting-plate and having its outer end provided with an external annular swell or rib fitting the countersunk hole of the said plate, and at its opposite end projecting inwardly beyond the hole in the bung-stave; and means for securing the inner end in position.

ALBERT TERRY, JUNR.

Witnesses:
 W. H. DAWSON,
 GEORGE MASSEY.